US012569761B2

(12) United States Patent
Stevenson

(10) Patent No.: US 12,569,761 B2
(45) Date of Patent: Mar. 10, 2026

(54) SYSTEM FOR GENERATING VISUAL CONTENT WITHIN A GAME APPLICATION ENVIRONMENT

(71) Applicant: Electronic Arts Inc., Redwood City, CA (US)

(72) Inventor: Adonis Stevenson, Hampshire (GB)

(73) Assignee: Electronic Arts Inc., Redwood City, CA (US)

( * ) Notice: Subject to any disclaimer, the term of this patent is extended or adjusted under 35 U.S.C. 154(b) by 193 days.

(21) Appl. No.: 18/327,540

(22) Filed: Jun. 1, 2023

(65) Prior Publication Data

US 2024/0399248 A1 Dec. 5, 2024

(51) Int. Cl.
| | |
|---|---|
| *A63F 13/25* | (2014.01) |
| *A63F 13/52* | (2014.01) |
| *G06T 7/70* | (2017.01) |
| *G06T 7/90* | (2017.01) |
| *G06T 13/20* | (2011.01) |
| *G06T 19/20* | (2011.01) |

(52) U.S. Cl.
CPC ................ *A63F 13/52* (2014.09); *G06T 7/70* (2017.01); *G06T 7/90* (2017.01); *G06T 13/20* (2013.01); *G06T 19/20* (2013.01); *G06T 2207/10024* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 5,274,801 | A | 12/1993 | Gordon |
| 5,548,798 | A | 8/1996 | King |
| 5,982,389 | A | 11/1999 | Guenter et al. |
| 5,999,195 | A | 12/1999 | Santangeli |
| 6,064,808 | A | 5/2000 | Kapur et al. |
| 6,088,040 | A | 7/2000 | Oda et al. |
| 6,253,193 | B1 | 6/2001 | Ginter et al. |
| 6,556,196 | B1 | 4/2003 | Blanz et al. |
| 6,961,060 | B1 | 11/2005 | Mochizuki et al. |
| 7,006,090 | B2 | 2/2006 | Mittring |

(Continued)

FOREIGN PATENT DOCUMENTS

| | | |
|---|---|---|
| CN | 102509272 A | 6/2012 |
| CN | 103546736 A | 1/2014 |

(Continued)

OTHER PUBLICATIONS

Ali, Kamran, and Charles E. Hughes. "Facial expression recognition using disentangled adversarial learning." arXiv preprint arXiv: 1909.13135 (2019). (Year: 2019).

(Continued)

*Primary Examiner* — Sunit Pandya
(74) *Attorney, Agent, or Firm* — Knobbe, Martens, Olson & Bear, LLP

(57) ABSTRACT

The present disclosure provides a system for generating and rendering virtual objects, such as mesh particles, using dynamic color blending within the virtual environment. Mesh particles may be divided up into portions. For example, the portions of the mesh particle may be a single pixel or a group of pixels. The color of the mesh particles can be dynamically determined for the portions of a mesh particle.

17 Claims, 6 Drawing Sheets

(56) References Cited

U.S. PATENT DOCUMENTS

| | | |
|---|---|---|
| 7,403,202 B1 | 7/2008 | Nash |
| 7,415,152 B2 | 8/2008 | Jiang et al. |
| 7,944,449 B2 | 5/2011 | Petrovic et al. |
| 8,100,770 B2 | 1/2012 | Yamazaki et al. |
| 8,142,282 B2 | 3/2012 | Canessa et al. |
| 8,154,544 B1 | 4/2012 | Cameron et al. |
| 8,207,971 B1 | 6/2012 | Koperwas et al. |
| 8,267,764 B1 | 9/2012 | Aoki et al. |
| 8,281,281 B1 | 10/2012 | Smyrl et al. |
| 8,395,626 B2 | 3/2013 | Millman |
| 8,398,476 B1 | 3/2013 | Sidhu et al. |
| 8,406,528 B1 | 3/2013 | Hatwich |
| 8,540,560 B2 | 9/2013 | Crowley et al. |
| 8,599,206 B2 | 12/2013 | Hodgins et al. |
| 8,624,904 B1 | 1/2014 | Koperwas et al. |
| 8,648,863 B1 | 2/2014 | Anderson et al. |
| 8,860,732 B2 | 10/2014 | Popovic et al. |
| 8,914,251 B2 | 12/2014 | Ohta |
| 9,067,097 B2 | 6/2015 | Lane et al. |
| 9,098,766 B2 | 8/2015 | Dariush et al. |
| 9,117,134 B1 | 8/2015 | Geiss et al. |
| 9,177,409 B2 | 11/2015 | Rennuit et al. |
| 9,208,613 B2 | 12/2015 | Mukai |
| 9,256,973 B2 | 2/2016 | Koperwas et al. |
| 9,317,954 B2 | 4/2016 | Li et al. |
| 9,483,860 B2 | 11/2016 | Hwang et al. |
| 9,616,329 B2 | 4/2017 | Szufnara et al. |
| 9,741,146 B1 | 8/2017 | Nishimura |
| 9,811,716 B2 | 11/2017 | Kim et al. |
| 9,826,898 B1 | 11/2017 | Jin et al. |
| 9,827,496 B1 | 11/2017 | Zinno |
| 9,858,700 B2 | 1/2018 | Rose et al. |
| 9,928,663 B2 | 3/2018 | Eisemann et al. |
| 9,947,123 B1 | 4/2018 | Green |
| 9,984,658 B2 | 5/2018 | Bonnier et al. |
| 9,987,749 B2 | 6/2018 | Nagendran et al. |
| 9,990,754 B1 | 6/2018 | Waterson et al. |
| 10,022,628 B1 | 7/2018 | Matsumiya et al. |
| 10,096,133 B1 | 10/2018 | Andreev |
| 10,118,097 B2 | 11/2018 | Stevens |
| 10,163,001 B2 | 12/2018 | Kim et al. |
| 10,198,845 B1 | 2/2019 | Bhat et al. |
| 10,297,066 B2 | 5/2019 | Brewster |
| 10,307,679 B2 * | 6/2019 | Noto ..................... A63F 13/525 |
| 10,314,477 B1 | 6/2019 | Goodsitt et al. |
| 10,388,053 B1 | 8/2019 | Carter, Jr. et al. |
| 10,403,018 B1 | 9/2019 | Worsham |
| 10,535,174 B1 | 1/2020 | Rigiroli et al. |
| 10,565,731 B1 | 2/2020 | Reddy et al. |
| 10,726,611 B1 | 7/2020 | Court |
| 10,733,765 B2 | 8/2020 | Andreev |
| 10,755,466 B2 | 8/2020 | Chamdani et al. |
| 10,783,690 B2 | 9/2020 | Sagar et al. |
| 10,792,566 B1 | 10/2020 | Schmid |
| 10,810,780 B2 | 10/2020 | Hutchinson et al. |
| 10,818,065 B1 | 10/2020 | Saito et al. |
| 10,856,733 B2 | 12/2020 | Anderson et al. |
| 10,860,838 B1 | 12/2020 | Elahie et al. |
| 10,878,540 B1 | 12/2020 | Stevens |
| 10,902,618 B2 | 1/2021 | Payne et al. |
| 11,017,560 B1 | 5/2021 | Gafni et al. |
| 11,062,494 B2 | 7/2021 | Orvalho et al. |
| 11,113,860 B2 | 9/2021 | Rigiroli et al. |
| 11,217,003 B2 | 1/2022 | Akhoundi et al. |
| 11,232,621 B2 | 1/2022 | Akhoundi et al. |
| 11,295,479 B2 | 4/2022 | Andreev |
| 11,504,625 B2 | 11/2022 | Stevens |
| 11,648,480 B2 | 5/2023 | Akhoundi |
| 11,798,176 B2 | 10/2023 | Payne et al. |
| 11,836,843 B2 | 12/2023 | Akhoundi et al. |
| 11,954,802 B2 * | 4/2024 | Ladavac ................ G06T 17/20 |
| 12,277,652 B2 * | 4/2025 | Mech ....................... G06T 7/11 |
| 12,293,435 B2 * | 5/2025 | Hsieh ................... G06T 11/001 |
| 2002/0013172 A1 | 1/2002 | Kaku et al. |
| 2002/0054054 A1 | 5/2002 | Sanbe |
| 2002/0089504 A1 | 7/2002 | Merrick et al. |
| 2002/0140696 A1 | 10/2002 | Futamura et al. |
| 2002/0180739 A1 | 12/2002 | Reynolds et al. |
| 2003/0038818 A1 | 2/2003 | Tidwell |
| 2004/0027352 A1 | 2/2004 | Minakuchi |
| 2004/0104912 A1 | 6/2004 | Yamamoto et al. |
| 2004/0138959 A1 | 7/2004 | Hlavac et al. |
| 2004/0227760 A1 | 11/2004 | Anderson et al. |
| 2004/0227761 A1 | 11/2004 | Anderson et al. |
| 2005/0237550 A1 | 10/2005 | Hu |
| 2006/0036514 A1 | 2/2006 | Steelberg et al. |
| 2006/0061574 A1 | 3/2006 | Ng-Thow-Hing et al. |
| 2006/0149516 A1 | 7/2006 | Bond et al. |
| 2006/0217945 A1 | 9/2006 | Leprevost |
| 2006/0250526 A1 | 11/2006 | Wang et al. |
| 2006/0262113 A1 | 11/2006 | Leprevost |
| 2006/0262114 A1 | 11/2006 | Leprevost |
| 2007/0085851 A1 | 4/2007 | Muller et al. |
| 2007/0097125 A1 | 5/2007 | Xie et al. |
| 2008/0049015 A1 | 2/2008 | Elmieh et al. |
| 2008/0111831 A1 | 5/2008 | Son et al. |
| 2008/0152218 A1 | 6/2008 | Okada |
| 2008/0268961 A1 | 10/2008 | Brook |
| 2008/0316202 A1 | 12/2008 | Zhou et al. |
| 2009/0066700 A1 | 3/2009 | Harding et al. |
| 2009/0315839 A1 | 12/2009 | Wilson et al. |
| 2010/0134501 A1 | 6/2010 | Lowe et al. |
| 2010/0251185 A1 | 9/2010 | Pattenden |
| 2010/0267465 A1 | 10/2010 | Ceminchuk |
| 2010/0277497 A1 | 11/2010 | Dong et al. |
| 2010/0302257 A1 | 12/2010 | Perez et al. |
| 2011/0012903 A1 | 1/2011 | Girard |
| 2011/0074807 A1 | 3/2011 | Inada et al. |
| 2011/0086702 A1 | 4/2011 | Borst et al. |
| 2011/0119332 A1 | 5/2011 | Marshall et al. |
| 2011/0128292 A1 | 6/2011 | Ghyme et al. |
| 2011/0164831 A1 | 7/2011 | Van Reeth et al. |
| 2011/0187731 A1 | 8/2011 | Tsuchida |
| 2011/0221755 A1 | 9/2011 | Geisner et al. |
| 2011/0269540 A1 | 11/2011 | Gillo et al. |
| 2011/0292055 A1 | 12/2011 | Hodgins et al. |
| 2011/0319164 A1 | 12/2011 | Matsushita et al. |
| 2012/0028706 A1 | 2/2012 | Raitt et al. |
| 2012/0083330 A1 | 4/2012 | Ocko |
| 2012/0115580 A1 | 5/2012 | Hornik et al. |
| 2012/0220376 A1 | 8/2012 | Takayama et al. |
| 2012/0244941 A1 | 9/2012 | Ostergren et al. |
| 2012/0303343 A1 | 11/2012 | Sugiyama et al. |
| 2012/0310610 A1 | 12/2012 | Ito et al. |
| 2012/0313931 A1 | 12/2012 | Matsuike et al. |
| 2013/0050464 A1 | 2/2013 | Kang |
| 2013/0063555 A1 | 3/2013 | Matsumoto et al. |
| 2013/0120439 A1 | 5/2013 | Harris et al. |
| 2013/0121618 A1 | 5/2013 | Yadav |
| 2013/0222433 A1 | 8/2013 | Chapman et al. |
| 2013/0235045 A1 | 9/2013 | Corazza et al. |
| 2013/0263027 A1 | 10/2013 | Petschnigg et al. |
| 2013/0271458 A1 | 10/2013 | Andrilukal et al. |
| 2013/0293538 A1 | 11/2013 | Mukai |
| 2013/0311885 A1 | 11/2013 | Wang et al. |
| 2014/0002463 A1 | 1/2014 | Kautzman et al. |
| 2014/0035929 A1 | 2/2014 | Matthews et al. |
| 2014/0035933 A1 | 2/2014 | Saotome |
| 2014/0066196 A1 | 3/2014 | Crenshaw |
| 2014/0198106 A1 | 7/2014 | Sumner et al. |
| 2014/0198107 A1 | 7/2014 | Thomaszewski et al. |
| 2014/0267312 A1 | 9/2014 | Powell |
| 2014/0327694 A1 | 11/2014 | Cao et al. |
| 2014/0340644 A1 | 11/2014 | Haine et al. |
| 2015/0113370 A1 | 4/2015 | Flider |
| 2015/0126277 A1 | 5/2015 | Aoyagi |
| 2015/0187113 A1 | 7/2015 | Rubin et al. |
| 2015/0221131 A1 | 8/2015 | Luo et al. |
| 2015/0235351 A1 | 8/2015 | Mirbach et al. |
| 2015/0243326 A1 | 8/2015 | Pacurariu et al. |
| 2015/0381925 A1 | 12/2015 | Varanasi et al. |
| 2016/0026926 A1 | 1/2016 | Yeung et al. |
| 2016/0042548 A1 | 2/2016 | Du et al. |
| 2016/0071470 A1 | 3/2016 | Kim et al. |

(56) References Cited

U.S. PATENT DOCUMENTS

| | | | |
|---|---|---|---|
| 2016/0078662 A1 | 3/2016 | Herman et al. | |
| 2016/0217723 A1 | 7/2016 | Kim et al. | |
| 2016/0220903 A1 | 8/2016 | Miller et al. | |
| 2016/0307369 A1 | 10/2016 | Freedman et al. | |
| 2016/0314617 A1 | 10/2016 | Forster et al. | |
| 2016/0353987 A1 | 12/2016 | Carrafa et al. | |
| 2016/0354693 A1 | 12/2016 | Yan et al. | |
| 2017/0090577 A1 | 3/2017 | Rihn | |
| 2017/0132827 A1 | 5/2017 | Tena et al. | |
| 2017/0161909 A1 | 6/2017 | Hamanaka et al. | |
| 2017/0301310 A1 | 10/2017 | Bonnier et al. | |
| 2017/0301316 A1 | 10/2017 | Farell | |
| 2017/0372505 A1 | 12/2017 | Bhat et al. | |
| 2018/0024635 A1 | 1/2018 | Kaifosh et al. | |
| 2018/0068178 A1 | 3/2018 | Theobalt et al. | |
| 2018/0122125 A1 | 5/2018 | Brewster | |
| 2018/0165864 A1 | 6/2018 | Jin et al. | |
| 2018/0211102 A1 | 7/2018 | Alsmadi | |
| 2018/0239526 A1 | 8/2018 | Varanasi et al. | |
| 2018/0338136 A1 | 11/2018 | Akaike et al. | |
| 2019/0121306 A1 | 4/2019 | Kaifosh et al. | |
| 2019/0122152 A1 | 4/2019 | McCoy et al. | |
| 2019/0172229 A1 | 6/2019 | Chan et al. | |
| 2019/0206181 A1 | 7/2019 | Sugai | |
| 2019/0325633 A1 | 10/2019 | Miller, IV et al. | |
| 2019/0392587 A1 | 12/2019 | Nowozin et al. | |
| 2020/0020138 A1 | 1/2020 | Smith et al. | |
| 2020/0020166 A1* | 1/2020 | Menard | G06V 10/82 |
| 2020/0051304 A1 | 2/2020 | Choi et al. | |
| 2020/0078683 A1 | 3/2020 | Anabuki et al. | |
| 2020/0151963 A1 | 5/2020 | Lee et al. | |
| 2020/0226811 A1 | 7/2020 | Kim et al. | |
| 2020/0258280 A1 | 8/2020 | Park et al. | |
| 2020/0302668 A1 | 9/2020 | Guo et al. | |
| 2020/0306640 A1 | 10/2020 | Kolen et al. | |
| 2020/0310541 A1 | 10/2020 | Reisman et al. | |
| 2020/0364303 A1 | 11/2020 | Liu et al. | |
| 2021/0042526 A1 | 2/2021 | Ikeda et al. | |
| 2021/0074004 A1 | 3/2021 | Wang et al. | |
| 2021/0097266 A1 | 4/2021 | Mangalam et al. | |
| 2021/0125036 A1 | 4/2021 | Tremblay et al. | |
| 2021/0142440 A1 | 5/2021 | Ahn et al. | |
| 2021/0192357 A1 | 6/2021 | Sinha et al. | |
| 2021/0220739 A1 | 7/2021 | Zinno et al. | |
| 2021/0255304 A1 | 8/2021 | Fontijne et al. | |
| 2021/0279956 A1 | 9/2021 | Chandran et al. | |
| 2021/0308580 A1 | 10/2021 | Akhoundi et al. | |
| 2021/0312688 A1 | 10/2021 | Akhoundi et al. | |
| 2021/0312689 A1 | 10/2021 | Akhoundi et al. | |
| 2021/0316221 A1 | 10/2021 | Waszak | |
| 2021/0335039 A1 | 10/2021 | Jones et al. | |
| 2021/0390789 A1 | 12/2021 | Liu et al. | |
| 2022/0020195 A1 | 1/2022 | Kuta et al. | |
| 2022/0051003 A1 | 2/2022 | Niinuma et al. | |
| 2022/0138455 A1 | 5/2022 | Nagano et al. | |
| 2022/0198733 A1 | 6/2022 | Akhoundi et al. | |
| 2022/0222892 A1 | 7/2022 | Luo et al. | |
| 2022/0383578 A1 | 12/2022 | Kennewick, Sr. et al. | |
| 2022/0398795 A1 | 12/2022 | Phan | |
| 2022/0398796 A1 | 12/2022 | Phan | |
| 2022/0398797 A1 | 12/2022 | Phan | |
| 2023/0013873 A1* | 1/2023 | Donalek | G06T 19/00 |
| 2023/0146141 A1 | 5/2023 | Stevens | |
| 2023/0186541 A1 | 6/2023 | Starke et al. | |
| 2023/0398456 A1 | 12/2023 | Akhoundi | |
| 2024/0046546 A1* | 2/2024 | Singla | G06T 15/04 |

FOREIGN PATENT DOCUMENTS

| | | | |
|---|---|---|---|
| CN | 105405380 A | 3/2016 | |
| CN | 105825778 A | 8/2016 | |
| CN | 107427723 A | 12/2017 | |
| CN | 109672780 A | 4/2019 | |
| JP | 2018-520820 A | 8/2018 | |
| JP | 2019-162400 A | 9/2019 | |

OTHER PUBLICATIONS

Anagnostopoulos et al., "Intelligent modification for the daltonization process", International Conference on Computer Vision Published in 2007 by Applied Computer Science Group of digitized paintings.

Andersson, S., Goransson, J.: Virtual Texturing with WebGL. Master's thesis, Chalmers University of Technology, Gothenburg, Sweden (2012).

Avenali, Adam, "Color Vision Deficiency and Video Games", The Savannah College of Art and Design, Mar. 2013.

Badlani et al., "A Novel Technique for Modification of Images for Deuteranopic Viewers", May 2016.

Belytschko et al., "Assumed strain stabilization of the eight node hexahedral element," Computer Methods in Applied Mechanics and Engineering, vol. 105(2), pp. 225-260 (1993), 36 pages.

Belytschko et al., Nonlinear Finite Elements for Continua and Structures, Second Edition, Wiley (Jan. 2014), 727 pages (uploaded in 3 parts).

Blanz V, Vetter T. A morphable model for the synthesis of 3D faces. In Proceedings of the 26th annual conference on Computer graphics and interactive techniques Jul. 1, 1999 (pp. 187-194). ACM Press/Addison-Wesley Publishing Co.

Blanz et al., "Reanimating Faces in Images and Video" Sep. 2003, vol. 22, No. 3, pp. 641-650, 10 pages.

Chao et al., "A Simple Geometric Model for Elastic Deformations", 2010, 6 pgs.

Cook et al., Concepts and Applications of Finite Element Analysis, 1989, Sections 6-11 through 6-14.

Cournoyer et al., "Massive Crowd on Assassin's Creed Unity: AI Recycling," Mar. 2, 2015, 55 pages.

Dick et al., "A Hexahedral Multigrid Approach for Simulating Cuts in Deformable Objects", IEEE Transactions on Visualization and Computer Graphics, vol. X, No. X, Jul. 2010, 16 pgs.

Diziol et al., "Robust Real-Time Deformation of Incompressible Surface Meshes", to appear in Proceedings of the 2011 ACM SIGGRAPH/Eurographics Symposium on Computer Animation (2011), 10 pgs.

Dudash, Bryan. "Skinned instancing." NVidia white paper(2007).

Fikkan, Eirik. Incremental loading of terrain textures. MS thesis. Institutt for datateknikk og informasjonsvitenskap, 2013.

Geijtenbeek, T. et al., "Interactive Character Animation using Simulated Physics", Games and Virtual Worlds, Utrecht University, The Netherlands, The Eurographics Association 2011, 23 pgs.

Georgii et al., "Corotated Finite Elements Made Fast and Stable", Workshop in Virtual Reality Interaction and Physical Simulation VRIPHYS (2008), 9 pgs.

Habibie et al., "A Recurrent Variational Autoencoder for Human Motion Synthesis", 2017, in 12 pages.

Halder et al., "Image Color Transformation for Deuteranopia Patients using Daltonization", IOSR Journal of VLSI and Signal Processing (IOSR-JVSP) vol. 5, Issue 5, Ver. I (Sep.-Oct. 2015), pp. 15-20.

Han et al., "On-line Real-time Physics-based Predictive Motion Control with Balance Recovery," Eurographics, vol. 33(2), 2014, 10 pages.

Hernandez, Benjamin, et al. "Simulating and visualizing real-time crowds on GPU clusters." Computación y Sistemas 18.4 (2014): 651-664.

Hu G, Chan CH, Yan F, Christmas W, Kittler J. Robust face recognition by an albedo based 3D morphable model. In Biometrics (IJCB), 2014 IEEE International Joint Conference on Sep. 29, 2014 (pp. 1-8). IEEE.

Hu Gousheng, Face Analysis using 3D Morphable Models, Ph.D. Thesis, University of Surrey, Apr. 2015, pp. 1-112.

Irving et al., "Invertible Finite Elements for Robust Simulation of Large Deformation", Eurographics/ACM SIGGRAPH Symposium on Computer Animation (2004), 11 pgs.

Kaufmann et al., "Flexible Simulation of Deformable Models Using Discontinuous Galerkin FEM", Oct. 1, 2008, 20 pgs.

Kavan et al., "Skinning with Dual Quaternions", 2007, 8 pgs.

(56) References Cited

OTHER PUBLICATIONS

Kim et al., "Long Range Attachments—A Method to Simulate Inextensible Clothing in Computer Games", Eurographics/ACM SIGGRAPH Symposium on Computer Animation (2012), 6 pgs.

Klein, Joseph. Rendering Textures up Close in a 3D Environment Using Adaptive Micro-Texturing. Diss. Mills College, 2012.

Komura et al., "Animating reactive motion using momentum-based inverse kinematics," Computer Animation and Virtual Worlds, vol. 16, pp. 213-223, 2005, 11 pages.

Lee, Y. et al., "Motion Fields for Interactive Character Animation", University of Washington, Bungie, Adobe Systems, 8 pgs, obtained Mar. 20, 2015.

Levine, S. et al., "Continuous Character Control with Low-Dimensional Embeddings", Stanford University, University of Washington, 10 pgs, obtained Mar. 20, 2015.

Macklin et al., "Position Based Fluids", to appear in ACM TOG 32(4), 2013, 5 pgs.

Mcadams et al., "Efficient Elasticity for Character Skinning with Contact and Collisions", 2011, 11 pgs.

McDonnell, Rachel, et al. "Clone attack! perception of crowd variety." ACM Transactions on Graphics (TOG). vol. 27. No. 3. ACM, 2008.

Muller et al., "Meshless Deformations Based on Shape Matching", SIGGRAPH 2005, 29 pgs.

Muller et al., "Adding Physics to Animated Characters with Oriented Particles", Workshop on Virtual Reality Interaction and Physical Simulation VRIPHYS (2011), 10 pgs.

Muller et al., "Real Time Dynamic Fracture with Columetric Approximate Convex Decompositions", ACM Transactions of Graphics, Jul. 2013, 11 pgs.

Muller et al., "Position Based Dymanics", VRIPHYS 2006, Oct. 21, 2014, Computer Graphics, Korea University, 23 pgs.

Musse, Soraia Raupp, and Daniel Thalmann. "Hierarchical model for real time simulation of virtual human crowds." IEEE Transactions on Visualization and Computer Graphics 7.2 (2001): 152-164.

Nguyen et al., "Adaptive Dynamics With Hybrid Response," 2012, 4 pages.

O'Brien et al., "Graphical Modeling and Animation of Brittle Fracture", GVU Center and College of Computing, Georgia Institute of Technology, Reprinted from the Proceedings of ACM SIGGRAPH 99, 10 pgs, dated 1999.

Olszewski, Kyle, et al. "Realistic Dynamic Facial Textures from a Single Image using GANs." Proceedings of the IEEE International Conference of Computer Vision. 2017, in 10 pages.

Orin et al., "Centroidal dynamics of a humanoid robot," Auton Robot, vol. 35, pp. 161-176, 2013, 18 pages.

Parker et al., "Real-Time Deformation and Fracture in a Game Environment", Eurographics/ACM SIGGRAPH Symposium on Computer Animation (2009), 12 pgs.

Pelechano, Nuria, Jan M. Allbeck, and Norman I. Badler. "Controlling individual agents in high-density crowd simulation." Proceedings of the 2007 ACM SIGGRAPH/Eurographics symposium on Computer animation. Eurographics Association, 2007. APA.

R. P. Prager, L. Troost, S. Bruggenjurgen, D. Melhart, G. Yannakakis and M. Preuss, "An Experiment on Game Facet Combination\," 2019, 2019 IEEE Conference on Games (CoG), London, UK, pp. 1-8, https://ieeexplore.ieee.org/stamp/stamp.jsp?tp=&arnumber=8848073 (Year: 2019).

Qiao, Fengchun, et al. "Geometry-contrastive gan for facial expression transfer." arXiv preprint arXiv:1802.01822 (2018). (Year: 2018).

Rivers et al., "FastLSM: Fast Lattice Shape Matching for Robust Real-Time Deformation", ACM Transactions on Graphics, vol. 26, No. 3, Article 82, Publication date: Jul. 2007, 6 pgs.

Ruiz, Sergio, et al. "Reducing memory requirements for diverse animated crowds." Proceedings of Motion on Games. ACM, 2013.

Rungjiratananon et al., "Elastic Rod Simulation by Chain Shape Matching withTwisting Effect" SIGGRAPH Asia 2010, Seoul, South Korea, Dec. 15-18, 2010, ISBN 978-1-4503-0439-9/10/0012, 2 pgs.

Seo et al., "Compression and Direct Manipulation of Complex Blendshape Models", In ACM Transactions on Graphics (TOG) Dec. 12, 2011 (vol. 30, No. 6, p. 164). ACM. (Year: 2011), 10 pgs.

Sifakis, Eftychios D., "FEM Simulations of 3D Deformable Solids: A Practioner's Guide to Theory, Discretization and Model Reduction. Part One: The Classical FEM Method and Discretization Methodology", SIGGRAPH 2012 Course, Version 1.0 [Jul. 10, 2012], 50 pgs.

Stomakhin et al., "Energetically Consistent Invertible Elasticity", Eurographics/ACM SIGRAPH Symposium on Computer Animation (2012), 9 pgs.

Thalmann, Daniel, and Soraia Raupp Musse. "Crowd rendering." Crowd Simulation. Springer London, 2013. 195-227.

Thalmann, Daniel, and Soraia Raupp Musse. "Modeling of Populations." Crowd Simulation. Springer London, 2013. 31-80.

Treuille, A. et al., "Near-optimal Character Animation with Continuous Control", University of Washington, 2007, 7 pgs.

Ulicny, Branislav, and Daniel Thalmann. "Crowd simulation for interactive virtual environments and VR training systems." Computer Animation and Simulation 2001 (2001 ): 163-170.

Vaillant et al., "Implicit Skinning: Real-Time Skin Deformation with Contact Modeling", (2013) ACM Transactions on Graphics, vol. 32 (n° 4). pp. 1-11. ISSN 0730-0301, 12 pgs.

Vigueras, Guillermo, et al. "A distributed visualization system for crowd simulations." Integrated Computer-Aided Engineering 18.4 (2011 ): 349-363.

Wu et al., "Goal-Directed Stepping with Momentum Control," Eurographics/ ACM SIGGRAPH Symposium on Computer Animation, 2010, 6 pages.

Zhang, Jiangning, et al. "Freenet: Multi-identity face reenactment." Proceedings of the IEEE/CVF conference on computer vision and pattern recognition. 2020. (Year: 2020).

Chan et al., 2022, "Efficient Geometry-aware 3D Generative Adversarial Networks".

Feng et al., 2021, "Learning an Animatable Detailed 3D Face Model from In-The-Wild Images".

Gao et al., 2022, "GET3D: A Generative Model of High Quality 3D Textured Shapes Learned from Images".

Munkberg et al., Apr. 2023, "Extracting Triangular 3D Models, Materials, and Lighting From Images".

* cited by examiner

602 — RECEIVE GAMEPLAY DATA

604 — DETERMINE SIMULATION DATA FOR VIRTUAL OBJECTS WITHIN A GAME SCENE

606 — GENERATE MESH PARTICLES BASED ON SIMULATION DATA

608 — DETERMINE RENDERING PARAMETERS FOR MESH PARTICLES

610 — RENDER MESH PARTICLES IN GAME SCENE BASED ON RENDERING PARAMETERS

SYSTEM FOR GENERATING VISUAL CONTENT WITHIN A GAME APPLICATION ENVIRONMENT

BACKGROUND

Video games are becoming increasingly more complex and realistic. In order to create more realistic environments, games are including additional graphical elements to flesh out the environments, such as weather effects (for example, rain or snow), day/night cycles, and other elements within a game environment. With increased processing capabilities of computing systems, there is a desire for more realistic and dynamic virtual environments within game applications.

SUMMARY OF EMBODIMENTS

The systems, methods, and devices of this disclosure each have several innovative aspects, no single one of which is solely responsible for the all of the desirable attributes disclosed herein.

In some aspects, the techniques described herein relate to a computer-implemented method for generating visual content within a game application, including: by a hardware processor configured with computer executable instructions, executing a game application including a virtual environment, the virtual environment including a plurality of virtual entities; determining simulation data associated with runtime of the game application based at least in part on gameplay information associated with a gameplay state of the game application; generating at least one mesh particle based at least in part on the simulation data, wherein each mesh particle is associated with a virtual entity, wherein each mesh particle includes a plurality of portions; for each portion of the plurality of portions, determining a position of the portion within the virtual environment; determining a distance from the portion to a defined location within the virtual environment; comparing the distance to at least one distance threshold; and determining a color for the portion based on the comparison of the first distance to the at least one distance threshold; rendering the at least one mesh particle within the game environment based at least in part on the determination of colors for each portion of the plurality of portions.

In some aspects, the techniques described herein relate to a computer-implemented method, wherein each portion of the plurality of portions is a pixel of the mesh particle, wherein each pixel includes independent rendering parameters.

In some aspects, the techniques described herein relate to a computer-implemented method, wherein the at least one distance threshold includes a first distance threshold associated with a first distance to the defined location, and a second distance threshold associated with a second distance to the defined location.

In some aspects, the techniques described herein relate to a computer-implemented method, wherein determining a color for the portion further includes determining a category based on based on the comparison of the distance to the first distance threshold and the second distance threshold, wherein the color of for the portion is based on the determined category, wherein the category includes at least a first category associated with a first color, a second category associated with a second color, and a third category associated with a blend of the first color and the second color.

In some aspects, the techniques described herein relate to a computer-implemented method, wherein the determined color of the third category is based on a relative position of the portion between the first threshold and the second threshold.

In some aspects, the techniques described herein relate to a computer-implemented method, wherein the distance is determined based on a three-dimensional coordinate system.

In some aspects, the techniques described herein relate to a computer-implemented method, wherein the defined location is a location on the virtual entity, wherein the virtual entity is movable within the virtual environment.

In some aspects, the techniques described herein relate to a computer-implemented method, wherein the defined location is a different location than an emitter configured to generate the at least one mesh particle associated with the virtual entity.

In some aspects, the techniques described herein relate to a computer-implemented method, wherein each mesh particle has a finite life within the virtual environment.

In some aspects, the techniques described herein relate to a computing system including: a data store storage device configured to store computer readable instruction configured to execute a game application; a processor configured to execute the game application including a virtual environment, the virtual environment including a plurality of virtual entities, the game application configured to: determine simulation data associated with runtime of the game application based at least in part on gameplay information associated with a gameplay state of the game application; generate at least one mesh particle based at least in part on the simulation data, wherein each mesh particle is associated with a virtual entity, wherein each mesh particle includes a plurality of portions; for each portion of the plurality of portions, determine a position of the portion within the virtual environment; determine a distance from the portion to a defined location within the virtual environment; compare the distance to at least one distance threshold; and determine a color for the portion based on the comparison of the first distance to the at least one distance threshold; render the at least one mesh particle within the game environment based at least in part on the determination of colors for each portion of the plurality of portions.

In some aspects, the techniques described herein relate to a computing system, wherein each portion of the plurality of portions is a pixel of the mesh particle, wherein each pixel includes independent rendering parameters.

In some aspects, the techniques described herein relate to a computing system, wherein the at least one distance threshold includes a first distance threshold associated with a first distance to the defined location, and a second distance threshold associated with a second distance to the defined location.

In some aspects, the techniques described herein relate to a computing system, wherein when the game application determines a color for the portion, the game application is further configured to determine a category based on based on the comparison of the distance to the first distance threshold and the second distance threshold, wherein the color of for the portion is based on the determined category, wherein the category includes at least a first category associated with a first color, a second category associated with a second color, and a third category associated with a blend of the first color and the second color.

In some aspects, the techniques described herein relate to a computing system, wherein the determined color of the third category is based on a relative position of the portion between the first threshold and the second threshold.

In some aspects, the techniques described herein relate to a computing system, wherein the distance is determined based on a three-dimensional coordinate system.

In some aspects, the techniques described herein relate to a computing system, wherein the defined location is a location on the virtual entity, wherein the virtual entity is movable within the virtual environment.

In some aspects, the techniques described herein relate to a non-transitory computer readable medium including computer-executable instructions for executing a game application that, when executed by a computer, causes the computer to: execute a game application including a virtual environment, the virtual environment including a plurality of virtual entities; determine simulation data associated with runtime of the game application based at least in part on gameplay information associated with a gameplay state of the game application; generate at least one mesh particle based at least in part on the simulation data, wherein each mesh particle is associated with a virtual entity, wherein each mesh particle includes a plurality of portions; for each portion of the plurality of portions, determine a position of the portion within the virtual environment; determine a distance from the portion to a defined location within the virtual environment; compare the distance to at least one distance threshold; and determine a color for the portion based on the comparison of the first distance to the at least one distance threshold; render the at least one mesh particle within the game environment based at least in part on the determination of colors for each portion of the plurality of portions.

In some aspects, the techniques described herein relate to a non-transitory computer readable medium, wherein each portion of the plurality of portions is a pixel of the mesh particle, wherein each pixel includes independent rendering parameters.

In some aspects, the techniques described herein relate to a non-transitory computer readable medium, wherein the at least one distance threshold includes a first distance threshold associated with a first distance to the defined location, and a second distance threshold associated with a second distance to the defined location.

In some aspects, the techniques described herein relate to a non-transitory computer readable medium, wherein when the game application determines a color for the portion, the game application is further configured to determine a category based on based on the comparison of the distance to the first distance threshold and the second distance threshold, wherein the color of for the portion is based on the determined category, wherein the category includes at least a first category associated with a first color, a second category associated with a second color, and a third category associated with a blend of the first color and the second color. Although certain embodiments and examples are disclosed herein, inventive subject matter extends beyond the examples in the specifically disclosed embodiments to other alternative embodiments and/or uses, and to modifications and equivalents thereof.

BRIEF DESCRIPTION OF THE DRAWINGS

Throughout the drawings, reference numbers are re-used to indicate correspondence between referenced elements. The drawings are provided to illustrate embodiments of the subject matter described herein and not to limit the scope thereof.

DETAILED DESCRIPTION OF EMBODIMENTS

Overview

One of the problems encountered in video games is generating high quality graphics during runtime. As graphics quality increases, the games become more complex and more detailed, each processing and rendering system can require complex processes to provide a high quality experience for all aspects the rendering processes.

One aspects of the rendering processes is the color shading of digital effects within the game application. It can be difficult to create dynamic digital effects that have a relatively short life within the game environment. It can be difficult to generate smooth color transitions for constantly changing meshes within the game environment. A mesh particle engine can be used during runtime of the game application to create mesh particles that generate dynamic special effects, such as explosions, smoke, fire, and other dynamic effects that can require a more complex particle representation than simple point or sprite particles. The mesh particles can be used to create a wide variety of dynamic and realistic particle effects, and can be an important tool for game developers to create immersive and engaging game worlds.

The present disclosure provides a system for generating and rendering virtual objects, such as mesh particles, using dynamic color blending within the virtual environment. Mesh particles may be divided up into portions. For example, the portions of the mesh particle may be a single pixel or a group of pixels. The color of the mesh particles can be dynamically determined for the portions of a mesh particle. The color of each portion of the mesh particle can be determined based on the position of the portion relative to a defined location. The data associated with one or more virtual entities and or the virtual environment can be passed to the rendering engine. The rendering engine can receive data associated with the game state, such as simulation data, particle data, and function data. The rendering engine can use the function data and the particle data to determine color characteristics associated with the mesh particle over the life of the mesh particle.

The location of each portion of the mesh particle can be compared to the defined location within the virtual environment. The relative position of each portion of the mesh particle can be compared to a one or more distance thresholds. Based on the result of the comparison, the portion of the mesh particles can be placed within a zone. For zone with a single color, the portion can be assigned the color associated with the zone. For a blend zone, the color blend of the colors can be determined based on the relative position of the portion within the blend zone. The game engine can generate the rendering parameters that define the color associated with each portion of the mesh particle(s) to be rendered within the game scene.

Overview of Video Game Environment

Figure 1:
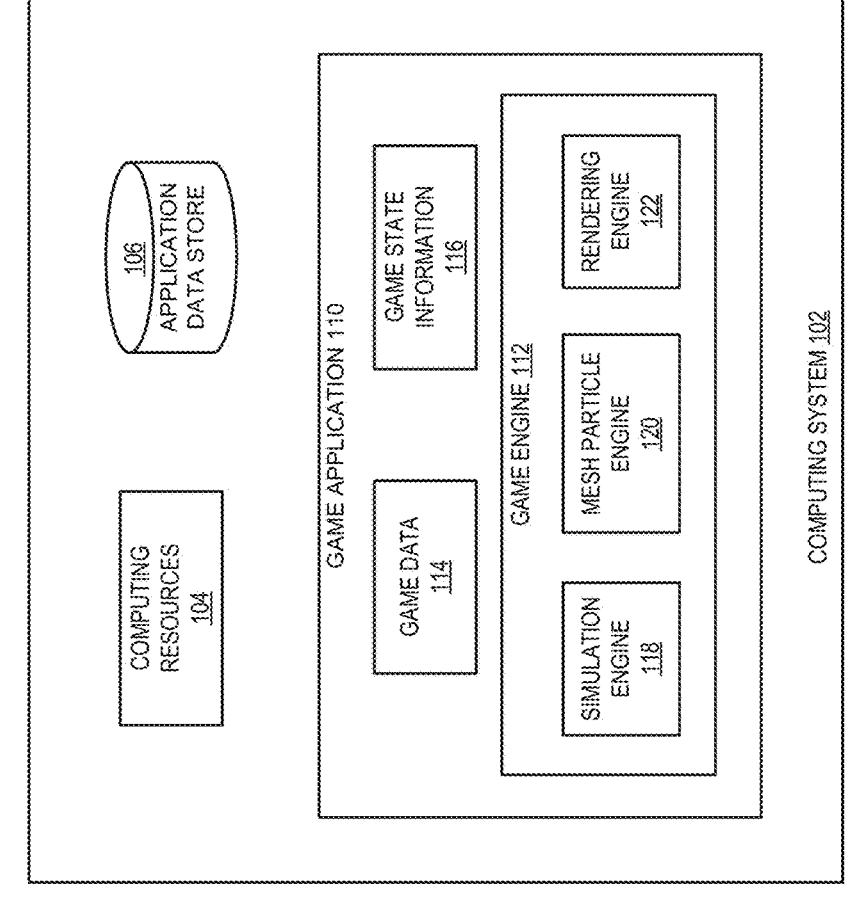
FIG. 1 illustrates an embodiment of a computing system that can implement one or more embodiments of a visual content generation system.

FIG. 1 illustrates an embodiment of a computing system 100 for executing a game application 110 on a user computing system 102. The user computing system 102 includes computing resources 104, an application data store 106, and a game application 110. The user computing system 102 may have varied local computing resources 104 such as central processing units and architectures, memory, mass storage, graphics processing units, communication network availability and bandwidth, and so forth. Further, the user computing system 102 may include any type of computing system. For example, the user computing system 102 may be any type of computing device, such as a desktop, laptop, video game platform/console, television set-top box, television (for example, Internet TVs), network-enabled kiosk, car-console device, computerized appliance, wearable device (for example, smart watches and glasses with computing functionality), and wireless mobile devices (for example, smart phones, personal digital assistants, tablets, or the like), to name a few. A more detailed description of an embodiment of user computing system 102 is described below with respect to FIG. 7.

Game Application

In one embodiment, the user computing system 102 can execute a game application 110 based on software code stored at least in part in the application data store 106. The game application 110 may also be referred to as a videogame, a game, game code, and/or a game program. A game application 110 should be understood to include software code that a user computing system 102 can use to provide a game for a user to play. A game application 110 may comprise software code that informs a user computing system 102 of processor instructions to execute, but may also include data used in the playing of the game, such as data relating to constants, images and other data structures. For example, in the illustrated embodiment, the game application 110 includes game data 114, game state information 116, and a game engine 112, which includes a simulation engine 118, a mesh particle engine 120, and a rendering engine 122.

In some embodiments, the user computing system 102 is capable of executing a game application 110, which may be stored and/or executed in a distributed environment. For example, the user computing system 102 may execute a portion of a game and a network-based computing system (not shown), may execute another portion of the game. For instance, the game may be an online car racing game that includes a client portion executed by the user computing system 102 and a server portion executed by one or more application host systems.

Game Engine

In one embodiment, the game engine 112 is configured to execute aspects of the operation of the game application 110 within the computing device 100. Execution of aspects of gameplay within a game application can be performed by the simulation engine 118, the mesh particle engine 120, and the rendering engine 122. The runtime execution of the game application can be based, at least in part, on the user input received, the game data 114, and/or the game state information 116. The game data 114 can include game rules, prerecorded motion capture poses/paths, environmental settings, constraints, skeleton models, and/or other game application information.

Simulation Engine

The simulation engine 118 can read in game rules and generates game state based on input received from one or more users. The simulation engine 118 can control execution of individual objects, such as virtual components, virtual effects and/or virtual characters, within the game application. The simulation engine 118 can manage and determine character movement, character states, collision detection, derive desired motions for characters and virtual objects (such as, cars) based gameplay information. The simulation engine 118 receives gameplay information, such as user inputs, and determines virtual entity events, such as actions, collisions, runs, driving direction, velocity, attacks and other events appropriate for the game. The virtual entity events can be controlled by movement rules that determine the appropriate motions the virtual entities should make in response to events. The simulation engine 118 can include a physics engine that can determine new poses for the virtual entities. The physics engine can have as its inputs, the skeleton models of various virtual entities, environmental settings, states such as current poses (for example, positions of body parts expressed as positions, joint angles, position of wheels, or other specifications), and velocities (linear and/or angular) of virtual objects and motions provided by a movement module, which can be in the form of a set of force/torque vectors for some or all components of the virtual entities. From this information, the physics engine generates movement, such as new poses for characters or a new position for a vehicle, using rules of physics and those new poses can be used to update virtual entity states. The simulation engine 118 provides for user input to control aspects of the game application according to defined game rules. Examples of game rules include rules for driving, shifting gears, possible inputs, actions/events, movement in response to inputs, and the like. Other components can control what inputs are accepted and how the game progresses, and other aspects of gameplay.

In one example, after the simulation engine 118 determines the in-game events, the in-game events can be conveyed to a movement engine that can determine the appropriate motions the virtual entity should make in response to the events and passes those motions on to a physics engine. The physics engine can determine new poses/positions for the virtual entities and provide the new poses/positions to a rendering engine.

Mesh Particle Engine

The mesh particle engine 120 can receive simulation data from the simulation engine 118 that can be used to generate particles during runtime of the game application 110. The generation of particles can be based on simulation data generated based on the game state. The mesh particle engine 120 can create particles that are represented within a game environment. The particles can be three-dimensional (3D) meshes that are generated during runtime. 3D meshes can be used instead of simple points or sprites. In a mesh particle system, each particle can be represented by a 3D mesh or model, which can be customized to create a wide variety of particle effects. These meshes can have complex shapes and textures, and can be animated or deformed over time to create dynamic particle effects.

The mesh particle engine 120 can be used during runtime of the game application to create special effects, such as explosions, smoke, fire, and other dynamic effects that can require a more complex particle representation than simple point or sprite particles. The mesh particle engine can generate new meshes, animate, and deform meshes for effects, which can be provided to a rendering engine.

The mesh particle engine 120 can also be used to create more realistic particle effects, such as smoke generated by spinning tires, leaves falling from trees, or water droplets splashing. The mesh particle engine 120 can create the mesh particles in real-time during runtime of the game engine. This can allow for a high degree of interactivity and responsiveness in the particle engine 120, which can be useful in generating dynamic effects in many types of game applications. The mesh particles can be used to create a wide variety of dynamic and realistic particle effects, and can be an important tool for game developers to create immersive and engaging game worlds.

Rendering Engine

The rendering engine 122 can generate and render frames for output to a display within the game application. The rendering engine 122 can use simulation data, particle data, function data, and other data to generate and render frames. The rendering engine is responsible for taking the 3D scene data, including the geometry of the objects, the lighting, and the camera view, and using it to generate a 2D image that represents the scene from the specified viewpoint. The rendering engine 122 can combine the virtual objects, such as virtual characters, animate objects, inanimate objects, background objects, lighting, reflection, and the like, in order to generate a full scene and a new frame for display.

The rendering engine 122 can take into account the surfaces, colors textures, and other parameters during the rendering process. The rendering engine 122 can combine the virtual objects (e.g., lighting within the virtual environment and virtual character images with inanimate and background objects) to generate and render a frame for display to the user. The process can repeated for rendering each frame during execution of the game application.

During the rendering process a surface shader can be used. A surface shader is a type of shader that can determine how light interacts with the surface of an object in a 3D scene. When light hits an object, it can interact with the surface of the object and can either be absorbed, reflected, or refracted. A surface shader can be responsible for calculating the amount and type of light that is reflected off the surface of the object. It can take into account the surface's color, texture, and other physical properties, such as roughness, glossiness, and transparency. Surface shaders can be used in by the rendering engine to create realistic-looking objects by simulating the way light interacts with real-world materials. They can be used to create a variety of surface effects, including matte surfaces, shiny surfaces, metallic surfaces, and more.

In the rendering process, once the geometry of a 3D object has been defined, and the object has been placed in the 3D scene with appropriate lighting, the surface shader is responsible for determining how light interacts with the surface of the object. During the shading stage, the renderer uses the surface shader to calculate the color and other appearance attributes of each point on the object's surface, based on the lighting and other parameters specified in the scene. The surface shader takes into account factors such as the object's texture, reflectivity, and transparency, as well as the angle of the incoming light and the angle of the viewer's perspective. The surface shader can be used to calculate the color based on additional data associated with the virtual object, such as a mesh particle. For example, the surface shader can determine a color blend of multiple colors for mesh particles. The surface shader can use function data and characteristics associated other virtual objects to determine a color blend for the mesh particle. In some instances, the surface shader can determine a color associated with a portion of a mesh particle, such as one or more pixels of the mesh particle, based on a distance of the portion from a reference point. The data associated with the distance can be generated by the simulation engine and provided to the rendering engine for use during the rendering process. After the surface shader has calculated the surface appearance for each portion on the virtual object, the renderer combines this information with other scene data, such as lighting and shadow information, to produce the final rendered image.

Game Data

The game data 114 can include game rules, prerecorded motion capture poses/paths, environmental settings, environmental objects, constraints, skeleton models, and/or other game application information. At least a portion of the game data 114 can be stored in the application data store 106. In some embodiments, a portion of the game data 114 may be received and/or stored remotely, in such embodiments, game data may be received during runtime of the game application.

Game State Information

During runtime, the game application 110 can store game state information 116, which can include a game state, character states, environment states, scene object storage, and/or other information associated with a runtime state of the game application 110. For example, the game state information 116 can identify the state of the game application 110 at a specific point in time, such as a character position, character action, game level attributes, and other information contributing to a state of the game application. The game state information can include dynamic state information that continually changes, such as character movement positions, and static state information, such as the identification of a game level within the game.

Virtual Environment

As used herein, a virtual environment may comprise a simulated environment (e.g., a virtual space) instanced on a user computing system 102. The virtual environment may be instanced on a server (e.g., an application host system 132 of the interactive computing system 130) that is accessible by a client (e.g., user computing system 102) located remotely from the server, to format a view of the virtual environment for display to a user of the client. The simulated environment may have a topography, express real-time interaction by the user, and/or include one or more objects positioned within the topography that are capable of locomotion within the topography. In some implementations, the topography may be a 2-dimensional topography. In other instances, the topography may be a 3-dimensional topography. In some implementations, the topography may be a single node. The topography may include dimensions of the virtual environment, and/or surface features of a surface or objects that are "native" to the virtual environment. In some implementations, the topography may describe a surface (e.g., a ground surface) that runs through at least a substantial portion of the virtual environment. In some implementations, the topography may describe a volume with one or more bodies positioned therein (e.g., a simulation of gravity-deprived space with one or more celestial bodies positioned therein). A virtual environment may include a virtual world, but this is not necessarily the case. For example, a virtual environment may include a game space that does not include one or more of the aspects generally associated with a virtual world (e.g., gravity, a landscape, etc.). By way of illustration, the well-known game Tetris may be formed as a two-dimensional topography in which bodies (e.g., the falling tetrominoes) move in accordance with predetermined parameters (e.g., falling at a predetermined speed, and shifting horizontally and/or rotating based on user interaction).

The game instance of the game application 110 may comprise a simulated virtual environment, for example, a virtual environment that is accessible by users via user computing systems 102 that present the views of the virtual environment to a user. The virtual environment may have a topography, express ongoing real-time interaction by one or more users and/or include one or more objects positioned within the topography that are capable of locomotion within the topography. In some instances, the topography may include a two-dimensional topography. In other instances, the topography may include a three-dimensional topography. The topography may include dimensions of the space and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). In some embodiments, the instance executed by the computer components may use synchronous, asynchronous, and/or semi-synchronous architectures.

It should be understood the above description of the manner in which state of the virtual environment associated with the video game is not intended to be limiting. The game application may be configured to express the virtual environment in a more limited, or richer, manner. For example, views determined for the video game representing the game state of the instance of the video game may be selected from a limited set of graphics depicting an occurrence in a given place within the video game. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the video game are contemplated.

The game application 110 generates game state information 116 that may be used locally within the game application and may be transmitted to the interactive computing system 130 over network 108. The execution of the instance of the game application 110 may include determining a game state associated with the game application. The game state information may facilitate presentation of views of the video game to the users on the user computing systems 102. The game state information may include information defining the virtual environment in which the video game is played.

The execution of the game instance may enable interaction by the users with the game application and/or other users through the interactive computing system 130. The game application may be configured to perform operations in the game instance in response to commands received over network 108 from user computing systems 102. In some embodiments, users may interact with elements in the video game and/or with each other through the video game.

Users may participate in the video game through client game applications implemented on user computing systems 102 associated with the users. Within the game instance of the video game executed by the state stream game engine, the users may participate by controlling one or more of an element in the virtual environment associated with the video game. The user-controlled elements may include avatars, user characters, virtual environment units (e.g., troops), objects (e.g., weapons, horses, vehicle and so on), simulated physical phenomena (e.g., wind, rain, earthquakes, and/or other phenomena), and/or other user-controlled elements.

The user-controlled avatars may represent the users in the virtual environment. The user characters may include heroes, knights, commanders, leaders, generals and/or any other virtual environment entities that may possess strength, skills, abilities, magic powers, knowledge, and/or any other individualized attributes. The virtual environment units controlled by the user may include troops and/or any other game entities that may be trained, recruited, captured, and/or otherwise acquired by the users in groups or en-mass. The objects controlled by the users may include weapons, vehicles, projectiles, magic items, wardrobes, boots, armor, knapsacks, medicine, healing portion, and/or any other virtual items that may be employed by the users for interaction within the video game.

The user controlled element(s) may move through and interact with the virtual environment (e.g., user-virtual environment units in the virtual environment, non-user characters in the virtual environment, other objects in the virtual environment). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual environment.

Controls of virtual elements in the video game may be exercised through commands input by a given user through user computing systems 102. The given user may interact with other users through communications exchanged within the virtual environment. Such communications may include one or more of textual chat, instant messages, private messages, voice communications, and/or other communications. Communications may be received and entered by the users via their respective user computing systems 102. Communications may be routed to and from the appropriate users through server(s) (e.g., through application host system 132).

Execution and/or performance of the user action by the game engine 112 may produce changes to the game state, which may reflect progresses and/or results of the user actions. In some examples, state changes caused by the execution of the user actions may be recorded in the application data store 106 to facilitate persistency throughout the instance of the video game. In some examples, execution of the user actions may not produce persistent changes to the game state (e.g., a user character jumping forward and backward successively may not produce any perceivable game state changes to other users).

A given user may input commands with specific parameters to undertake specific deeds, actions, functions, spheres of actions and/or any other types of interactions within the virtual environment. For example, the given user may input commands to construct, upgrade and/or demolish virtual buildings; harvest and/or gather virtual resources; heal virtual user-controlled elements, non-player entities and/or elements controlled by other users; train, march, transport, reinforce, reassign, recruit, and/or arrange troops; attack, manage, create, demolish and/or defend cities, realms, kingdoms, and/or any other virtual environment locations controlled by or associated with the users; craft or transport virtual items; interact with, compete against or along with non-player entities and/or virtual environment elements controlled by other users in combats; research technologies and/or skills; mine and/or prospect for virtual resources; complete missions, quests, and/or campaigns; exercise magic power and/or cast spells; and/or perform any other specific deeds, actions, functions, or sphere of actions within the virtual environment. In some examples, the given user may input commands to compete against elements in an environment within the virtual environment—e.g., Player vs. Environment (PvE) activities. In some examples, the given user may input commands to compete against each other within the virtual environment—e.g., Player vs. Player (PvP) activities.

The instance of the game application 110 may comprise virtual entities automatically controlled in the instance of the game application. Such virtual entities may or may not be associated with any user. As such, the automatically controlled virtual entities may be generated and/or developed by artificial intelligence configured with the game application and/or servers (e.g., application host system(s)) by a provider, administrator, moderator, and/or any other entities related to the game application. These automatically controlled entities may evolve within the video game free from user controls and may interact with the entities controlled by or associated with the users, other automatically controlled virtual environment entities, as well as the topography of the virtual environment. Certain manifested traits may be associated with the automatically controlled entities in accordance with the artificial intelligence configured with server(s) (e.g., application host system 132). As used herein, such automatically controlled virtual environment entities in the instance of the video game are referred to as "non-player entities."

In an online game, the instance of the video game may be persistent. That is, the video game may continue on whether or not individual users are currently logged in and/or participating in the video game. A user that logs out of the video game and then logs back in some time later may find the virtual environment and/or the video game has been changed through the interactions of other users with the video game during the time the user was logged out. These changes may include changes to the simulated physical space, changes in the user's inventory, changes in other users' inventories, changes experienced by non-user characters, and/or other changes.

Virtual Entity

Figures 2, 3:
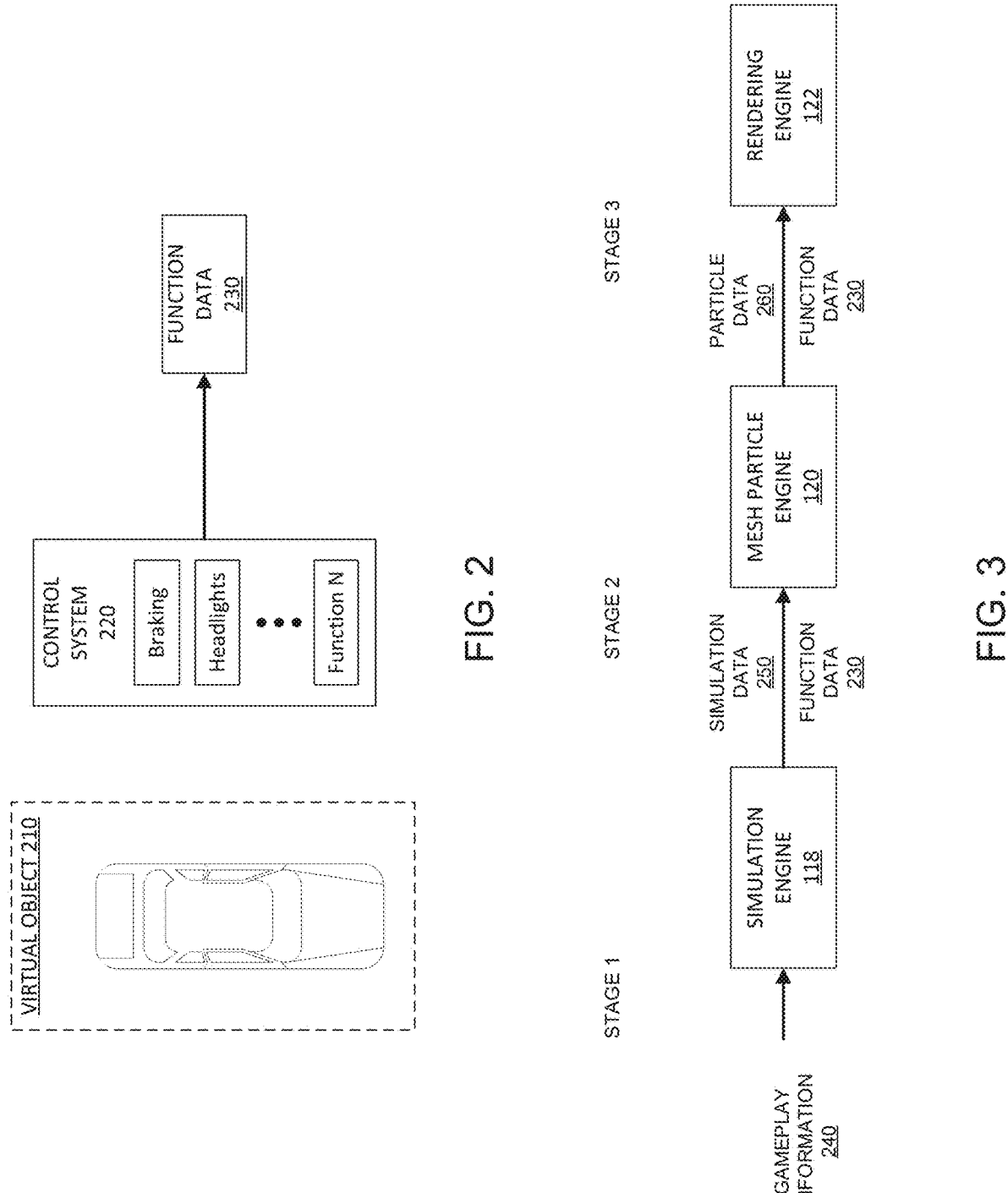
FIG. 2 illustrates an example embodiment of a control system associated with a virtual object within a game application.
FIG. 3 illustrates one embodiment of a block diagram illustrating a data flow for generation of visual content for a game application.

FIG. 2 illustrates an embodiment of a virtual entity 210 that can be used within a virtual environment of the game application 110. The virtual entity can be any type of entity associated with the game application, such as a vehicle (e.g., a car), a humanoid character, an animal, or any other entity within the virtual environment. The entities may be controlled by a user or may be automatically controlled by the game engine 112.

Each virtual entity 210 may have an associated control system 220. The control system can be include a plurality of functions that determine how the virtual entity behaves within the virtual environment. In the illustrated example, the virtual entity 210 is a vehicle and the control system can include functionality associated with behaviors of the vehicle, such as braking, headlights, and any other number of functions. During runtime, the simulation engine 118 can utilize the control system associated with the virtual entity 210 to determine how the virtual entity 210 behaves based on the game state information 116. The control system can output function data 230, which can be passed to the appropriate modules of the game engine 112, such as the simulation engine 118, the mesh particle engine 120, and the rendering engine 122 to generate the appropriate behavior of the virtual entity 210 and render the virtual entity 210 within the virtual environment. For example, based on gameplay information, the vehicle may generate smoke from the tires during a burnout or a drift, the headlights may be turned on/off, the vehicle may brake, accelerate, or perform other functions.

Runtime Operation

FIG. 3 illustrates an embodiment of a runtime operation of the game engine 112 to generate and render virtual objects, such as mesh particles, using dynamic color blending within the virtual environment. During runtime, the simulation engine 118 receives gameplay data 240 generated during runtime. The simulation engine 118 can output simulation data 250 and function data 230 associated with virtual entities 210. The function data can be generated by control system(s) 220 associated with the virtual entities 210. The simulation data 250 can include instructions sent to the mesh particle engine 120 to generate one or more mesh particles based on the simulation data 250. The mesh particle engine 120 can generate particles based on functionality defined by the control system 220 associated with a virtual entity 210. For example, a vehicle can include functions that generate smoke based on operation of the vehicle during runtime. The control system 220 can determine that type of mesh particles and the location in which the mesh particles are generated, such as be emitter 540 illustrated in FIGS. 5A and 5B.

The mesh particle engine 120 can generate the mesh particles based on the simulation data 250. The mesh particles create a wide variety of effects, including explosions, smoke, fire, water, and others. The mesh particle engine 120 can generate the appropriate mesh particles based on the simulation data and the virtual entity. The data passed through the mesh particle engine 120 can include function data 230 that may not be used to generate the mesh particles. For example, positional data associated with the virtual entity, such as the position of components of the virtual entity 210 (e.g., positions of wheels, the positions of components of the car), and other information that may be associated with a virtual entity 210.

The particle data, simulation data, and function data can be provided to the rendering engine 122, which can use the data to determine the rendering properties associated with the mesh particles. For example, the rendering engine can determine the color of the mesh particles. The rendering of the mesh particles can be based on the particle data and the function data for the particle effects. In some embodiments, the system shader within the rendering engine can determine the color of the mesh particles to be rendered within a game scene. As will be further discussed herein, the rendering engine can dynamically color blend portions of the mesh particles based on the data received during runtime. For example, the rendering can select colors for each pixel of a mesh particle at each frame.

Time-Based Color Blend

Figures 4A, 4B:
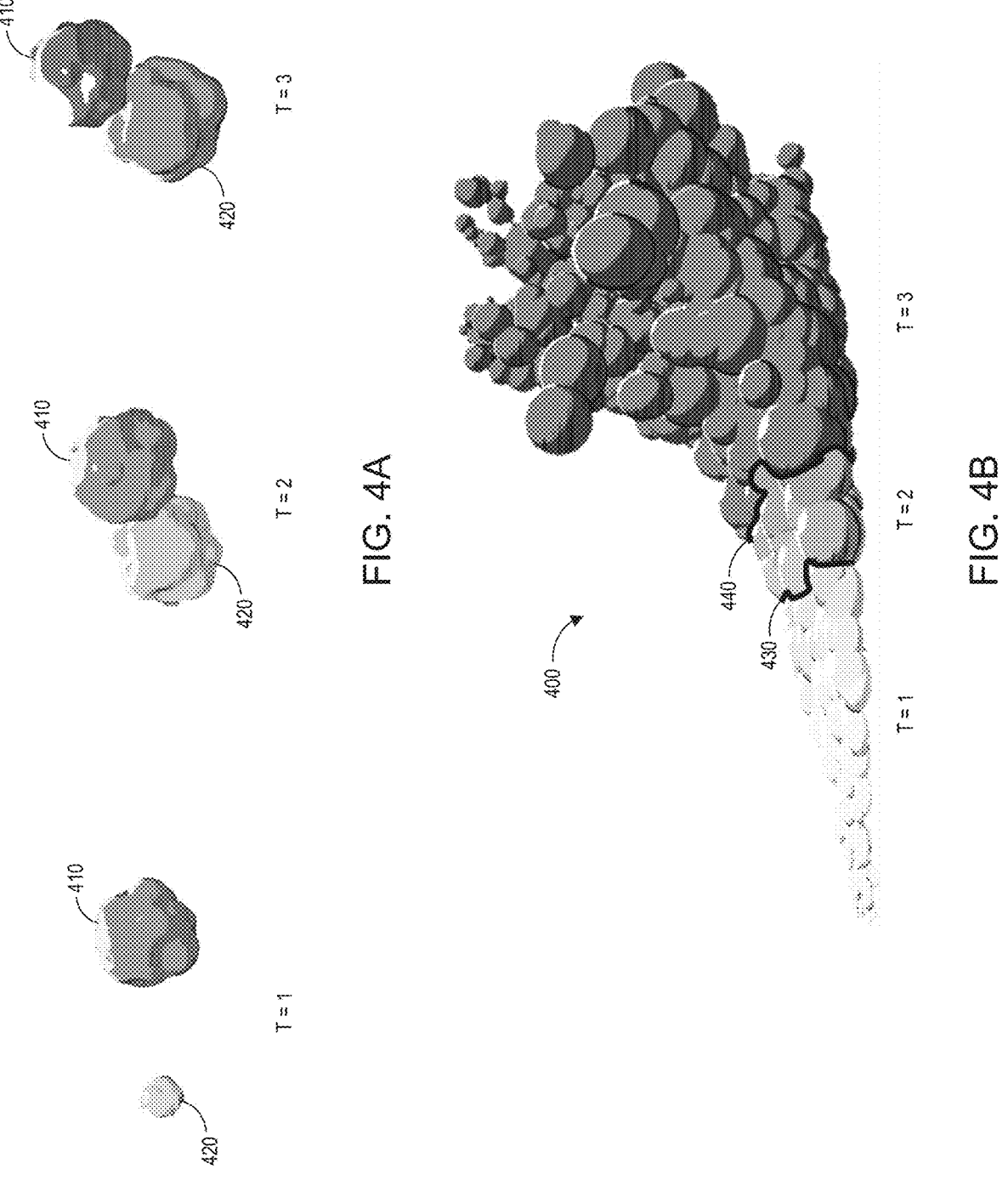
FIGS. 4A and 4B illustrate embodiments of visual content generated for a game application.

In one instance the particle color can be generated based on the time in which they were created, such as illustrated in FIGS. 4A and 4B. The colors associated with the mesh particles can have a finite life and can change colors between a range of colors over the life of the mesh particle. In some instances, the entire particle can have the same defined color over the course of the life of the mesh particle. The color of the particle can change over the life of the particle. For example, the color of the particle can change from a first color to a second color over the life of the particle. In some instances, the mesh particles can change based on other characteristics associated with a virtual entity or the virtual environment.

With reference to FIGS. 4A and 4B color change of a mesh particle based on the time of life of the particle is illustrated. FIG. 4A illustrates an embodiment where the MPs change color of the entire particle based on time. As illustrated, there is a first time, T=1, a second time, T=2, and a third time, T=3. There is a first particle 410, and a second particle 420. At T=1, the first particle 410 is a first color and the second particle 420 is a second color. At T=2, as the first particle 410 increases in size and moves closer to the second particle the different between the color creates a noticeable contrast between the particles. At T=3, the first particle 410 transitions to the second color and the second particle 420 transitions to a third color. The contrast between the colors is also readily apparent.

FIG. 4B further illustrates how using time to determine the color of particles can generate noticeable variations in color and not create a smooth transition from the first color to the third color. At T=1, the particles are a first color, at T=2, the particles are a second color, and at T=3, the particles are a third color. Lines 430 and 440 illustrate the discrete cutoff between each of the different time periods. The use of discrete colors based on time can result a larger contrast between particles and less smooth color blends.

Dynamic Color Blend

Figures 5A, 5B:
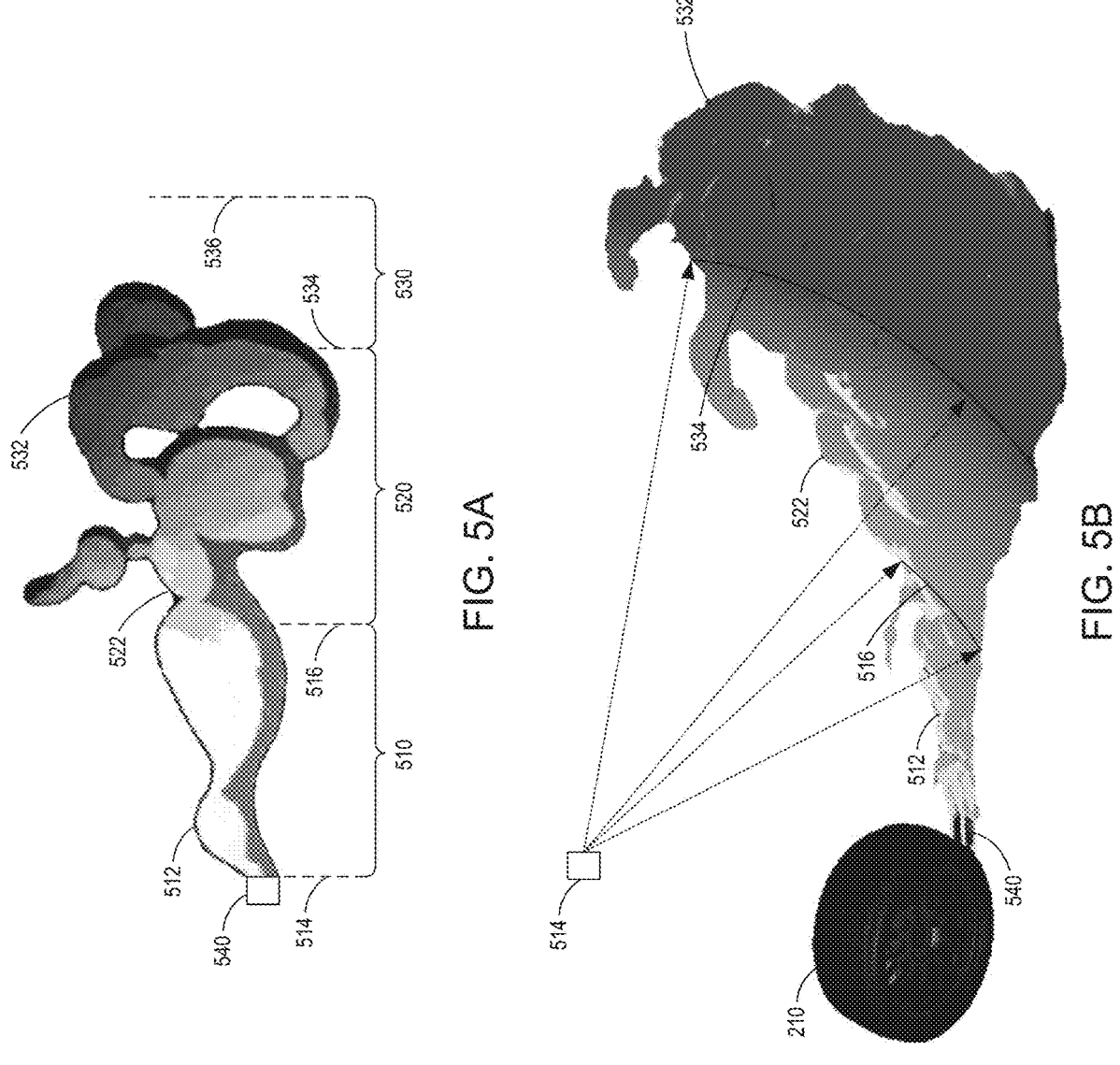
FIGS. 5A and 5B illustrate embodiments of visual content generated for a game application.

With reference to FIGS. 5A and 5B, a system for generating dynamic color blends of mesh particles is illustrated. Multiple colors can be used to dynamically generate a color blend of a mesh particle. The mesh particle may be divided up into portions. For example, the portions of the mesh particle may be a single pixel or a group of pixels. The color (also referred to as a base color) of mesh particles can be dynamically determined for the portions of a mesh particle. For example, the color of a mesh particle can be determined individually for each pixel. Rather than determining the color of the entire mesh particle based on the life of the particle (such as described with respect to FIGS. 4A and 4B). Components of the rendering engine, such as a system shader, can implement dynamic color blend functionality based on data received from other components within the game engine, such as the simulation engine 118 and the mesh particle engine 120. The rendering engine 122 can analyze each portion of the mesh particle individually to determine the color of the associated portion.

The color of each portion of the mesh particle can be determined based on the position of the portion relative to a defined location 514. The data associated with one or more virtual entities and or the virtual environment can be passed to the rendering engine. The rendering engine 122 can receive data associated with the game state, such as simulation data, particle data, and function data. The rendering engine 122 can use the function data and the particle data to determine color characteristics associated with the mesh particle over the life of the mesh particle. As described with respect to FIG. 3, the function data generated in association with a virtual entity 210 can include positional data, such as the position of the virtual entity, positions of components of the virtual entity, velocity, acceleration, and other positional characteristics associated with a virtual entity. The positional data can be passed from the simulation engine 118 to the mesh particle engine 120, and to the rendering engine 122 from the mesh particle engine 120. The mesh particle occupies a position within the virtual environment relative to other particles and virtual entities within the virtual environment. The color determined for portions of the mesh particle can be based on the position relative to a defined location 514. The defined location 514 can be associated with a virtual entity 210 and/or a virtual object within the virtual environment.

FIGS. 5A and 5B illustrates a plurality of zones that can be used to implement dynamic color blending. In the illustrated embodiments three zones are illustrated, a first zone 510, a second zone 520, and a third zone 530. The first zone 510 is associated with a first base color 512. The first zone 510 includes a defined location 514 and a first distance threshold 516. The third zone 530 is associated with a second color 532. The third zone 530 includes a second distance threshold 534. The second zone 520 is associated with a color blend zone 522 for blending the first color 512 and the second color 532.

The zones can be defined by distance thresholds that can be used to determine the base color of portions of the particle(s). Each portion of the particle is compared to the defined location 514 within the virtual environment. The defined location 514 may be a location on a moving virtual entity 210 (such as a defined location on a car, or a tip of a magic wand) or a static virtual entity within the environment (such as a stop light). The defined location 514 may be in the same location of a particle emitter 540, such as illustrated in FIG. 5A. Portions of particles located in the first zone 510, between the defined location 514 and a first distance threshold 516, have a first base color 512, such as white. Portions of particles located in the third zone 530, greater than a second threshold distance 534, have a second base color 532. Portions of particles in the second zone 520, have a color blend that can ramp from the first color at the first distance threshold 516 to the second color 532 at the second distance threshold 534. FIG. 5A illustrates an example of color bands transitioning between the first color to the second color. The smoothness of the transition can depend on the size of the portion of the particle. For example, the transitional color can be calculated for each pixel within the mesh particle. FIG. 5B illustrates a smoother blend within the second zone 520, which can be based on a smaller portion size. The color can be based on the position without relevance to the life of the particle. For example, a particle life may expire when portions of the particle are in multiple different zones. The first distance threshold and the second distance threshold can be defined during development based on the parameters of development.

FIG. 5B helps to illustrate the zones within a 3D virtual environment. A virtual entity 210 of a wheel is illustrated. The wheel can be a component of a larger virtual entity, such as a car (not shown). The virtual entity 210 can include functions that are configured to generate mesh particles. The virtual entity 210 can include a mesh particle emitter 540. The emitter 540 can be used to generate the mesh particles associated with the virtual object within the virtual environment. The defined location 514 can be the same as the emitter (such as illustrated in FIG. 5A) or can be in a different location (such as illustrated in FIG. 5B). As noted herein, the defined location 514 can be affixed to a virtual entity, such that it has a relative position within the virtual environment. The defined location 514 may have a fixed position relative to an emitter 540. For example, the defined location 514 may be a center point on the car, which can be used for particles associated with multiple emitters 540 (e.g., both rear wheels of a car). The multiple emitters can then use the same defined location for determining the location of a portion of the particle relative to the defined location 514.

The distance thresholds of the first threshold 516 and the second threshold 534 can be defined distances from the from the defined location 514. The distance from the location 514 to the may be computed within a 2D or 3D coordinate space, such as a cartesian coordinate system. The distance thresholds can result in a series of concentric circles/spheres around the location 514. This can be more clearly seen in FIG. 5B.

In the embodiments in FIGS. 5A and 5B, a two-color system with first and second distance thresholds are used to calculate a dynamic color blend. The dynamic color blend functionality can be configured to utilize any number of colors and/or threshold to implement multiple color blends within the particles. Multiple color blend zones may be included. For example, the third zone could be configured to blend the second color with a third color. In another example, element 536 may be a third distance threshold for blending the second color with the third color in a fourth zone.

Dynamic Color Blending Process

Figure 6:
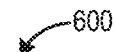
FIG. 6 illustrates a flowchart of an embodiment of a content streaming process.
Figure 6:
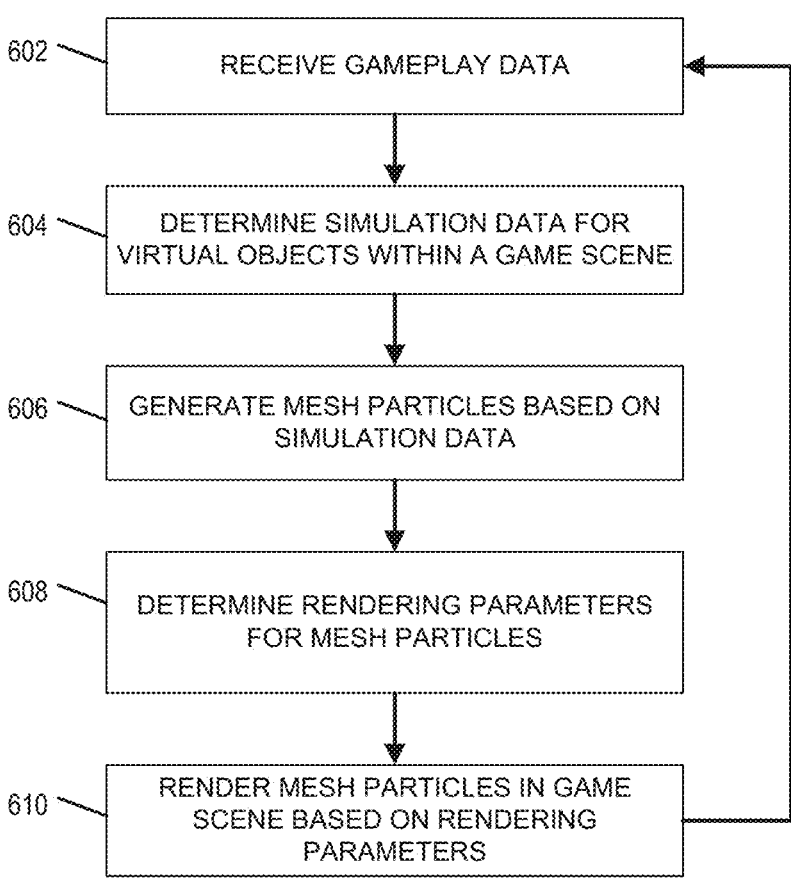

FIG. 6 illustrates an embodiment of a flowchart for a process for execution of a dynamic color blending process during runtime of a game application. The process 600 can be implemented by any system that can decode and stream content within a game environment during runtime of a game application. For example, the process 600, in whole or in part, can be implemented by a game application 110, a game engine 112, a simulation engine 118, a mesh particle engine 120, a rendering engine 122, or other application modules. Although any number of systems, in whole or in part, can implement the process 600, to simplify discussion, the process 600 will be described with respect to the computing system 102.

At block 602, gameplay data is received by the game engine. The gameplay information may include information such as location of the virtual entity within the virtual game environment, movement associated with the virtual entity, in-game lighting, and other factors that can determine the actions performed by virtual entities within the virtual environment. The game engine can receive updated gameplay information multiple times per second. In some embodiments, the gameplay information can be provided to a simulation engine 118.

At block 604, the game engine determines simulation data for virtual entities within a game scene based on the gameplay data. The simulation engine 118 can output simulation data 250 and function data 230 associated with virtual entities 210. The function data can be generated by control system(s) 220 associated with the virtual entities 210.

At block 606, the game engine can generate one or more mesh particles based on the simulation data, decodes the assets based on the priority information. The simulation data 250 can include instructions sent to the mesh particle engine 120 to generate one or more mesh particles based on the simulation data 250. The mesh particle engine 120 can generate particles based on functionality defined by the control system 220 associated with a virtual entity 210. For example, a vehicle can include functions that generate smoke based on operation of the vehicle during runtime. The control system 220 can determine that type of mesh particles and the location in which the mesh particles are generated. The mesh particle engine 120 can generate the mesh particles based on the simulation data 250. The mesh particles create a wide variety of effects, including explosions, smoke, fire, water, and others. The mesh particle engine 120 can generate the appropriate mesh particles based on the simulation data and the virtual entity. The data passed through the mesh particle engine 120 can include function data 230 that may not be used to generate the mesh particles.

At block 608, the game engine can determine rendering parameters for mesh particles. The rendering parameters for the mesh particles can be determined based on the function data, particle data, and simulation data. The mesh particle may be divided up into portions. For example, the portions of the mesh particle may be a single pixel or a group of pixels. The color (also referred to as a base color) of mesh particles can be dynamically determined for the portions of a mesh particle. The color of each portion of the mesh particle can be determined based on the position of the portion relative to a defined location 514. The data associated with one or more virtual entities and or the virtual environment can be passed to the rendering engine. The rendering engine 122 can receive data associated with the game state, such as simulation data, particle data, and function data. The rendering engine 122 can use the function data and the particle data to determine color characteristics associated with the mesh particle over the life of the mesh particle.

The location of each portion of the mesh particle can be compared to the defined location 514 within the virtual environment. The relative position of each portion of the mesh particle can be compared to a one or more distance thresholds. Based on the result of the comparison, the portion of the mesh particles can be placed within a zone. For zone with a single color, the portion can be assigned the color associated with the zone. For a blend zone, the color blend of the colors can be determined based on the relative position of the portion within the blend zone. The game engine can generate the rendering parameters that define the color associated with each portion of the mesh particle(s) to be rendered within the game scene.

At block 610, render mesh particles within game scene based on rendering parameters. The rendering engine 122 can use the rendering parameters, such as the surfaces, colors, and textures, to generate a frame for the game scene. The rendering engine 122 can combine the virtual objects, including the mesh particles, to generate and render a frame for display to the user.

Overview of Computing Device

Figure 7:
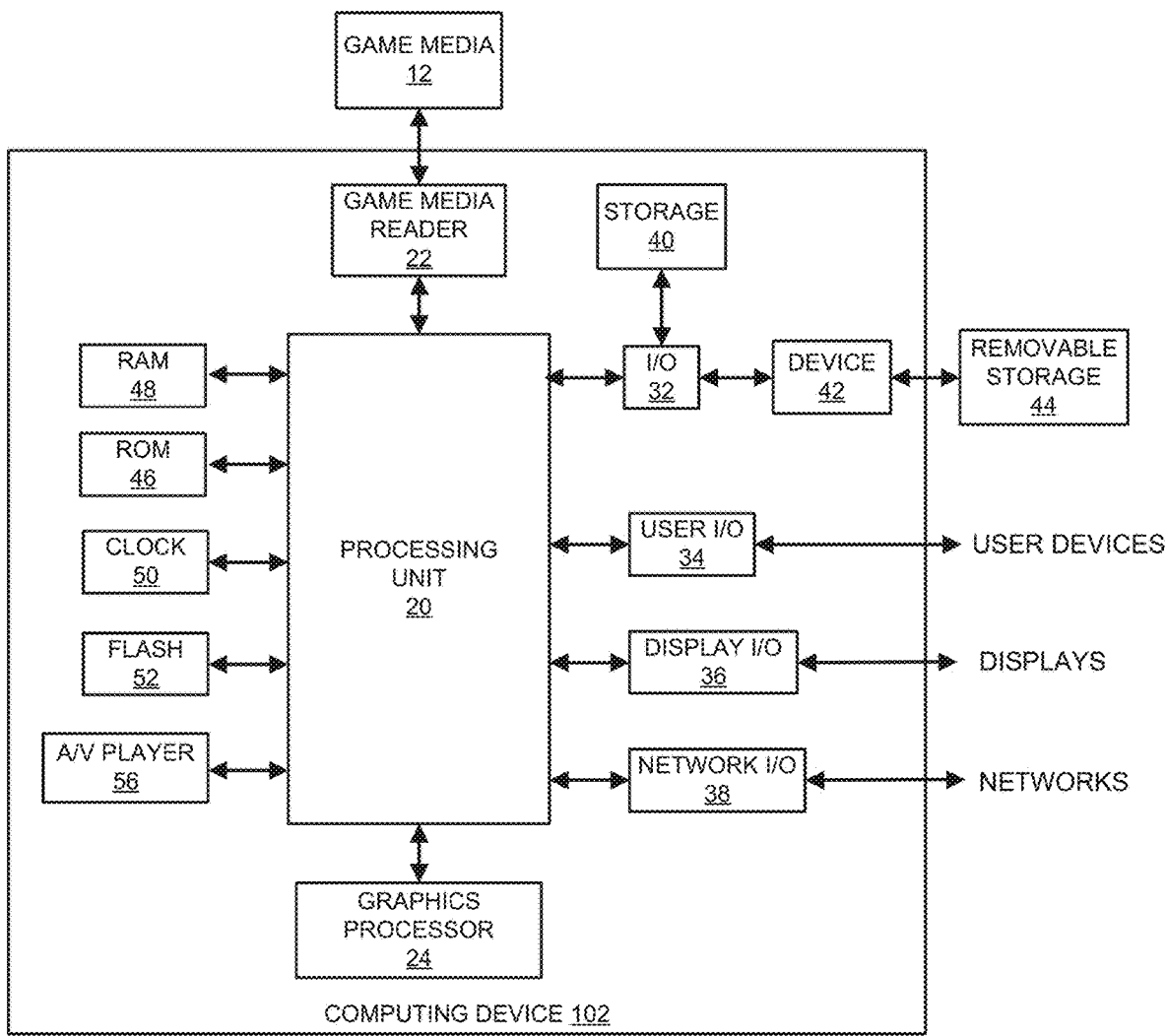
FIG. 7 illustrates an embodiment of a computing device.

FIG. 7 illustrates an embodiment of computing device 10 according to the present disclosure. Other variations of the computing device 10 may be substituted for the examples explicitly presented herein, such as removing or adding components to the computing device 100. The computing device 10 may include a game device, a smart phone, a tablet, a personal computer, a laptop, a smart television, a car console display, a server, and the like. As shown, the computing device 10 includes a processing unit 20 that interacts with other components of the computing device 10 and also external components to computing device 10. A media reader 22 is included that communicates with media 12. The media reader 22 may be an optical disc reader capable of reading optical discs, such as CD-ROM or DVDs, or any other type of reader that can receive and read data from game media 12. One or more of the computing devices may be used to implement one or more of the systems disclosed herein.

Computing device 10 may include a separate graphics processor 24. In some cases, the graphics processor 24 may be built into the processing unit 20. In some such cases, the graphics processor 24 may share Random Access Memory (RAM) with the processing unit 20. Alternatively, or in addition, the computing device 10 may include a discrete graphics processor 24 that is separate from the processing unit 20. In some such cases, the graphics processor 24 may have separate RAM from the processing unit 20. Computing device 10 might be a handheld video game device, a dedicated game console computing system, a general-purpose laptop or desktop computer, a smart phone, a tablet, a car console, or other suitable system.

Computing device 10 also includes various components for enabling input/output, such as an I/O 32, a user I/O 34, a display I/O 36, and a network I/O 38. I/O 32 interacts with storage element 40 and, through a device 42, removable storage media 44 in order to provide storage for computing device 10. Processing unit 20 can communicate through I/O 32 to store data, such as game state data and any shared data files. In addition to storage 40 and removable storage media 44, computing device 10 is also shown including ROM (Read-Only Memory) 46 and RAM 48. RAM 48 may be used for data that is accessed frequently, such as when a game is being played or the fraud detection is performed.

User I/O 34 is used to send and receive commands between processing unit 20 and user devices, such as game controllers. In some embodiments, the user I/O can include a touchscreen inputs. The touchscreen can be capacitive touchscreen, a resistive touchscreen, or other type of touchscreen technology that is configured to receive user input through tactile inputs from the user. Display I/O 36 provides input/output functions that are used to display images from the game being played. Network I/O 38 is used for input/output functions for a network. Network I/O 38 may be used during execution of a game, such as when a game is being played online or being accessed online and/or application of fraud detection, and/or generation of a fraud detection model.

Display output signals produced by display I/O 36 comprising signals for displaying visual content produced by computing device 10 on a display device, such as graphics, user interfaces, video, and/or other visual content. Computing device 10 may comprise one or more integrated displays configured to receive display output signals produced by display I/O 36. According to some embodiments, display output signals produced by display I/O 36 may also be output to one or more display devices external to computing device 10, such a display 16.

The computing device 10 can also include other features that may be used with a game, such as a clock 50, flash memory 52, and other components. An audio/video player 56 might also be used to play a video sequence, such as a movie. It should be understood that other components may be provided in computing device 10 and that a person skilled in the art will appreciate other variations of computing device 10.

Program code can be stored in ROM 46, RAM 48 or storage 40 (which might comprise hard disk, other magnetic storage, optical storage, other non-volatile storage or a combination or variation of these). Part of the program code can be stored in ROM that is programmable (ROM, PROM, EPROM, EEPROM, and so forth), part of the program code can be stored in storage 40, and/or on removable media such as game media 12 (which can be a CD-ROM, cartridge, memory chip or the like, or obtained over a network or other electronic channel as needed). In general, program code can be found embodied in a tangible non-transitory signal-bearing medium.

Random access memory (RAM) 48 (and possibly other storage) is usable to store variables and other game and processor data as needed. RAM is used and holds data that is generated during the execution of an application and portions thereof might also be reserved for frame buffers, application state information, and/or other data needed or usable for interpreting user input and generating display outputs. Generally, RAM 48 is volatile storage and data stored within RAM 48 may be lost when the computing device 10 is turned off or loses power.

As computing device 10 reads media 12 and provides an application, information may be read from game media 12 and stored in a memory device, such as RAM 48. Additionally, data from storage 40, ROM 46, servers accessed via a network (not shown), or removable storage media 46 may be read and loaded into RAM 48. Although data is described as being found in RAM 48, it will be understood that data does not have to be stored in RAM 48 and may be stored in other memory accessible to processing unit 20 or distributed among several media, such as media 12 and storage 40.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain embodiments, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (for example, X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for generating visual content within a game application, comprising:

by a hardware processor configured with computer executable instructions, executing a game application comprising a virtual environment, the virtual environment comprising a plurality of virtual entities;

determining simulation data associated with runtime of the game application based at least in part on gameplay information associated with a gameplay state of the game application;

generating at least one mesh particle based at least in part on the simulation data, wherein each mesh particle is associated with a virtual entity, wherein each mesh particle comprises a plurality of portions;

for each portion of the plurality of portions, determining a position of the portion within the virtual environment;

determining a distance from the portion to a defined location within the virtual environment;

comparing the distance to at least one distance threshold; and determining a color for the portion based on the comparison of the distance to the at least one distance threshold;

rendering the at least one mesh particle within the game environment based at least in part on the determination of colors for each portion of the plurality of portions, wherein each portion of the plurality of portions is a pixel of the mesh particle, wherein each pixel includes independent rendering parameters.

2. The computer-implemented method of claim 1, wherein the at least one distance threshold comprises a first distance threshold associated with a first distance to the defined location, and a second distance threshold associated with a second distance to the defined location.

3. The computer-implemented method of claim 2, wherein determining a color for the portion further comprises determining a category based on based on the comparison of the distance to the first distance threshold and the second distance threshold, wherein the color of for the portion is based on the determined category, wherein the category includes at least a first category associated with a first color, a second category associated with a second color, and a third category associated with a blend of the first color and the second color.

4. The computer-implemented method of claim 3, wherein the determined color of the third category is based on a relative position of the portion between the first threshold and the second threshold.

5. The computer-implemented method of claim 4, wherein the distance is determined based on a three-dimensional coordinate system.

6. The computer-implemented method of claim 1, wherein the defined location is a location on the virtual entity, wherein the virtual entity is movable within the virtual environment.

7. The computer-implemented method of claim 6, wherein the defined location is a different location than an emitter configured to generate the at least one mesh particle associated with the virtual entity.

8. The computer-implemented method of claim 1, wherein each mesh particle has a finite life within the virtual environment.

9. A computing system comprising:

a data store storage device configured to store computer readable instruction configured to execute a game application;

a processor configured to execute the game application comprising a virtual environment, the virtual environment comprising a plurality of virtual entities, the game application configured to:

determine simulation data associated with runtime of the game application based at least in part on gameplay information associated with a gameplay state of the game application;

generate at least one mesh particle based at least in part on the simulation data, wherein each mesh particle is associated with a virtual entity, wherein each mesh particle comprises a plurality of portions;

for each portion of the plurality of portions, determine a position of the portion within the virtual environment;

determine a distance from the portion to a defined location within the virtual environment;

compare the distance to at least one distance threshold; and determine a color for the portion based on the comparison of the first distance to the at least one distance threshold;

render the at least one mesh particle within the game environment based at least in part on the determination of colors for each portion of the plurality of portions, wherein each portion of the plurality of portions is a pixel of the mesh particle, wherein each pixel includes independent rendering parameters.

10. The computing system of claim 9, wherein the at least one distance threshold comprises a first distance threshold associated with a first distance to the defined location, and a second distance threshold associated with a second distance to the defined location.

11. The computing system of claim 10, wherein when the game application determines a color for the portion, the game application is further configured to determine a category based on based on the comparison of the distance to the first distance threshold and the second distance threshold, wherein the color of for the portion is based on the determined category, wherein the category includes at least a first category associated with a first color, a second category associated with a second color, and a third category associated with a blend of the first color and the second color.

12. The computing system of claim 11, wherein the determined color of the third category is based on a relative position of the portion between the first threshold and the second threshold.

13. The computing system of claim 12, wherein the distance is determined based on a three-dimensional coordinate system.

14. The computing system of claim 9, wherein the defined location is a location on the virtual entity, wherein the virtual entity is movable within the virtual environment.

15. A non-transitory computer readable medium comprising computer-executable instructions for executing a game application that, when executed by a computer, causes the computer to:

execute a game application comprising a virtual environment, the virtual environment comprising a plurality of virtual entities;

determine simulation data associated with runtime of the game application based at least in part on gameplay information associated with a gameplay state of the game application;

generate at least one mesh particle based at least in part on the simulation data, wherein each mesh particle is associated with a virtual entity, wherein each mesh particle comprises a plurality of portions;

for each portion of the plurality of portions, determine a position of the portion within the virtual environment;

determine a distance from the portion to a defined location within the virtual environment;

compare the distance to at least one distance threshold; and determine a color for the portion based on the comparison of the first distance to the at least one distance threshold;

render the at least one mesh particle within the game environment based at least in part on the determination of colors for each portion of the plurality of portions, wherein each portion of the plurality of portions is a pixel of the mesh particle, wherein each pixel includes independent rendering parameters.

16. The non-transitory computer readable medium of claim 15, wherein the at least one distance threshold comprises a first distance threshold associated with a first distance to the defined location, and a second distance threshold associated with a second distance to the defined location.

17. The non-transitory computer readable medium of claim 16, wherein when the game application determines a color for the portion, the game application is further configured to determine a category based on based on the comparison of the distance to the first distance threshold and the second distance threshold, wherein the color of for the portion is based on the determined category, wherein the category includes at least a first category associated with a first color, a second category associated with a second color, and a third category associated with a blend of the first color and the second color.

* * * * *